United States Patent
Suzuki et al.

(10) Patent No.: US 12,025,428 B2
(45) Date of Patent: Jul. 2, 2024

(54) METHOD FOR CALIBRATING CNC PROCESSING APPARATUS

(71) Applicant: HEXAGON METROLOGY KABUSHIKI KAISHA, Sagamihara (JP)

(72) Inventors: Masahiro Suzuki, Hamamatsu (JP); Satoshi Suzuki, Hamamatsu (JP); Andreas Hieble, Waldburg (DE)

(73) Assignee: HEXAGON METROLOGY KABUSHIKI KAISHA, Sagamihara (JP)

( * ) Notice: Subject to any disclaimer, the term of this patent is extended or adjusted under 35 U.S.C. 154(b) by 353 days.

(21) Appl. No.: 17/598,823

(22) PCT Filed: Mar. 16, 2020

(86) PCT No.: PCT/JP2020/011564
§ 371 (c)(1),
(2) Date: Sep. 27, 2021

(87) PCT Pub. No.: WO2020/196063
PCT Pub. Date: Oct. 1, 2020

(65) Prior Publication Data
US 2022/0178679 A1 Jun. 9, 2022

(30) Foreign Application Priority Data
Mar. 28, 2019 (JP) .................. 2019-063455

(51) Int. Cl.
*G01B 11/24* (2006.01)
*G01B 5/008* (2006.01)
(Continued)

(52) U.S. Cl.
CPC .............. *G01B 11/24* (2013.01); *G01B 5/008* (2013.01); *G01B 11/005* (2013.01);
(Continued)

(58) Field of Classification Search
CPC ... G01B 11/002; G01B 11/005; G01B 11/007; G01B 11/24; G01B 11/2408;
(Continued)

(56) References Cited

U.S. PATENT DOCUMENTS

| 5,297,055 A | * | 3/1994 | Johnstone | .......... G05B 19/4015 |
| | | | | 700/195 |
| 6,112,423 A | * | 9/2000 | Sheehan | .............. G01B 21/042 |
| | | | | 73/1.01 |

(Continued)

FOREIGN PATENT DOCUMENTS

| CN | 106354094 A | 1/2017 |
| JP | H06-186025 A | 7/1994 |

(Continued)

OTHER PUBLICATIONS

European Search Report and Written Opinion in Application No. 20779337.3 Dated Nov. 28, 2022.

*Primary Examiner* — Gordon J Stock, Jr.
(74) *Attorney, Agent, or Firm* — Maschoff Brennan

(57) ABSTRACT

A method for calibrating a CNC processing apparatus is provided that can significantly reduce the amount of operation time required for sensor calibration. A method of the present invention for calibrating a non-contact sensor in a CNC processing apparatus 1 includes a first step, a second step and a third step. In the first step, the center coordinates of a reference instrument are measured with a contact probe and thereby the machine coordinates of the center of the reference instrument are determined. In the second step, after a non-contact sensor 110 is mounted onto a spindle 26, the center coordinates of the reference instrument are measured only one time with the non-contact sensor 110, and thereby the non-contact sensor coordinates of the center of the reference instrument are determined. In the third step, calculations are made to determine the amount of displace- (Continued)

ment required to bring the non-contact sensor coordinates obtained in the second step into agreement with the machine coordinates obtained with the contact probe in the first step.

2 Claims, 6 Drawing Sheets

(51) Int. Cl.
  *G01B 11/00* (2006.01)
  *G01B 21/04* (2006.01)
  *G05B 19/401* (2006.01)

(52) U.S. Cl.
  CPC ......... *G01B 21/042* (2013.01); *G05B 19/401* (2013.01); *G05B 2219/37008* (2013.01); *G05B 2219/37198* (2013.01); *G05B 2219/50252* (2013.01)

(58) Field of Classification Search
  CPC ............ G01B 11/2416; G01B 11/2425; G01B 11/2441; G01B 11/245; G01B 11/25; G01B 11/2504; G01B 11/2518; G01B 21/042; G01B 5/004; G01B 5/008; G01B 5/012; G01B 5/016; G05B 2219/37; G05B 2219/37008; G05B 2219/37009; G05B 2219/37198; G05B 2219/37281; G05B 2219/50252; G05B 19/19; G05B 19/401; G05B 19/4015; G05B 19/402; G05B 19/40; B23Q 17/002; B23Q 17/003; B23Q 17/20; B23Q 17/22; B23Q 17/2216; B23Q 17/2233; B23Q 17/2241; B23Q 17/225; B23Q 17/2266; B23Q 17/2275; B23Q 17/2291; B23Q 17/24; B23Q 2230/002; B25J 9/1692
  See application file for complete search history.

(56) References Cited

U.S. PATENT DOCUMENTS

| | | | | |
|---|---|---|---|---|
| 6,812,665 B2 * | 11/2004 | Gan | ...................... | B25J 9/1692 |
| | | | | 318/568.17 |
| 6,941,192 B2 * | 9/2005 | Tang | ...................... | B25J 9/1692 |
| | | | | 700/262 |
| 7,055,367 B2 * | 6/2006 | Hajdukiewicz | ...... | G01B 21/042 |
| | | | | 702/155 |
| 7,131,207 B2 * | 11/2006 | McFarland | .......... | G01B 21/042 |
| | | | | 33/503 |
| 8,122,610 B2 * | 2/2012 | Tait | ...................... | G01B 21/042 |
| | | | | 33/502 |
| 8,363,904 B2 * | 1/2013 | Takahashi | ............ | G01B 11/005 |
| | | | | 356/601 |
| 10,073,435 B2 * | 9/2018 | Sagemueller | ........ | G05B 19/402 |
| 10,580,152 B2 * | 3/2020 | Slettemoen | .............. | G01D 5/26 |
| 10,641,602 B2 * | 5/2020 | Ruck | ........................ | G01B 9/04 |
| 10,648,791 B2 * | 5/2020 | Lamendola | ........ | G01B 11/2504 |
| 11,289,303 B2 * | 3/2022 | Chen | .................. | G01B 11/2755 |
| 11,585,650 B2 * | 2/2023 | Iseli | ................... | G01B 9/02072 |
| 11,754,387 B2 * | 9/2023 | Shepherd | ........... | G01B 11/2416 |
| | | | | 33/503 |
| 2006/0053646 A1 | 3/2006 | McFarland | | |
| 2011/0085177 A1 | 4/2011 | Fukumoto et al. | | |
| 2011/0307212 A1 * | 12/2011 | Nishikawa | ........... | G05B 19/401 |
| | | | | 702/152 |
| 2016/0191911 A1 | 6/2016 | Filhaber et al. | | |
| 2018/0058840 A1 | 3/2018 | Lamendola | | |
| 2019/0304131 A1 * | 10/2019 | Gesner | ................ | G01B 11/005 |
| 2019/0375066 A1 | 12/2019 | Suzuki et al. | | |

FOREIGN PATENT DOCUMENTS

| | | | | | |
|---|---|---|---|---|---|
| JP | 2006-162537 A | | 6/2006 | | |
| JP | 2006162537 A | * | 6/2006 | | |
| JP | 2006349547 A | | 12/2006 | | |
| JP | 2011-085399 A | | 4/2011 | | |
| JP | 2013-088341 A | | 5/2013 | | |
| JP | 2016-191663 A | | 11/2016 | | |
| JP | 2016191663 A | * | 11/2016 | | |
| JP | 2018-87749 A | | 6/2018 | | |
| WO | WO-9408205 A1 | * | 4/1994 | .......... | G01B 11/007 |
| WO | 02/27268 A1 | | 4/2002 | | |
| WO | WO-2007107324 A1 | * | 9/2007 | .......... | G01B 21/042 |
| WO | WO-2013091698 A1 | * | 6/2013 | .......... | G01B 11/007 |
| WO | WO-2018101268 A1 | * | 6/2018 | ............. | B23Q 17/20 |

\* cited by examiner

METHOD FOR CALIBRATING CNC PROCESSING APPARATUS

TECHNICAL FIELD

The present invention relates to a method for calibrating a CNC processing apparatus capable of three-dimensional profile measurement.

BACKGROUND ART

CNC processing apparatuses capable of processing a workpiece (an object) with computer numerical control are conventionally known. Also known are CNC processing apparatuses that can measure the three-dimensional profile (the surface shape) of a workpiece after processing of the workpiece. For example, such known CNC processing apparatuses are disclosed in Patent Documents 1 and 2.

The CNC processing apparatus disclosed in Patent Document 1, after finishing a cutting process, replaces the working tool with a contact sensor such as a touch probe. Next, the stylus of the touch probe is brought into contact with the surface of the workpiece to determine the distance to the surface of the workpiece. The surface shape of the workpiece may be measured based on the numerical data acquired with the touch probe.

The CNC processing apparatus disclosed in Patent Document 2, after finishing a cutting process, replaces the working tool with a non-contact sensor capable of measuring the distance to the surface using a laser beam. The surface shape of the workpiece may be measured based on the numerical data acquired with the non-contact sensor.

The CNC processing apparatuses disclosed in Patent Documents 1 and 2 are designed so that after the apparatus has completed the processing of a workpiece, the working tool is replaced with a sensor. Such CNC processing apparatuses can measure the surface shape of a workpiece continuously after the processing of the workpiece.

A CNC processing apparatus requires calibration (adjustment) of a sensor to ensure that the surface shape of a workpiece will be measured accurately. The method disclosed in Patent Document 3 is conventionally known as a technique for calibrating a three-dimensional profile measuring apparatus.

PRIOR ART REFERENCES

Patent Document

Patent Document 1: Japanese Patent Application Kokai Publication No. 2013-088341
Patent Document 2: Japanese Patent Application Kokai Publication No. 2018-87749
Patent Document 3: Japanese Patent Application Kokai Publication No. 2006-162537

SUMMARY OF INVENTION

Problems to be Solved by the Invention

In the conventional apparatuses disclosed in Patent Documents 1 and 2, there is a slight clearance between a sensor mounting holder and a mounting hole in the spindle and consequently the position of the sensor sometimes moves slightly when the sensor is replaced for the working tool. Thus, the position of the sensor needs to be calibrated each time the tool is replaced with the sensor in order to ensure that the surface shape of the workpiece will be measured accurately.

In the method for calibrating a three-dimensional profile measuring apparatus disclosed in Patent Document 3, each calibration involves measurement of the center coordinates of at least three spheres in the sensor area. Thus, the method has a drawback in that each calibration takes a large amount of time.

The present invention has been made in view of the circumstances discussed above. An objective of the present invention is therefore to significantly reduce the amount of operation time required for calibrating a sensor in a CNC processing apparatus capable of three-dimensional profile measurement.

Means for Solving the Problems

Some aspects of the present invention for solving the problems discussed above reside in the following.

(1) In a CNC processing apparatus configured to process an object with a tool, replace the tool mounted on a spindle with a non-contact sensor, and measure the surface shape of the object with the non-contact sensor, a method for calibrating the non-contact sensor including:
  a first step of measuring the center coordinates of a reference instrument with a contact probe and thereby determining the machine coordinates of the center of the reference instrument,
  a second step of, after mounting of the non-contact sensor onto the spindle, measuring the center coordinates of the reference instrument only one time with the non-contact sensor, and thereby determining the non-contact sensor coordinates of the center of the reference instrument, and
  a third step of calculating the amount of displacement required to bring the non-contact sensor coordinates obtained in the second step into agreement with the machine coordinates obtained with the contact probe in the first step.

(2) The method described in (1), wherein the reference instrument is spherical.

Advantageous Effects of Invention

According to the present invention, it is possible to significantly reduce the amount of operation time required for calibrating a sensor in a CNC processing apparatus capable of three-dimensional profile measurement.

DESCRIPTION OF EMBODIMENTS

A CNC processing apparatus according to an embodiment of the present invention will be described hereinbelow with reference to the drawings.

Figure 1:
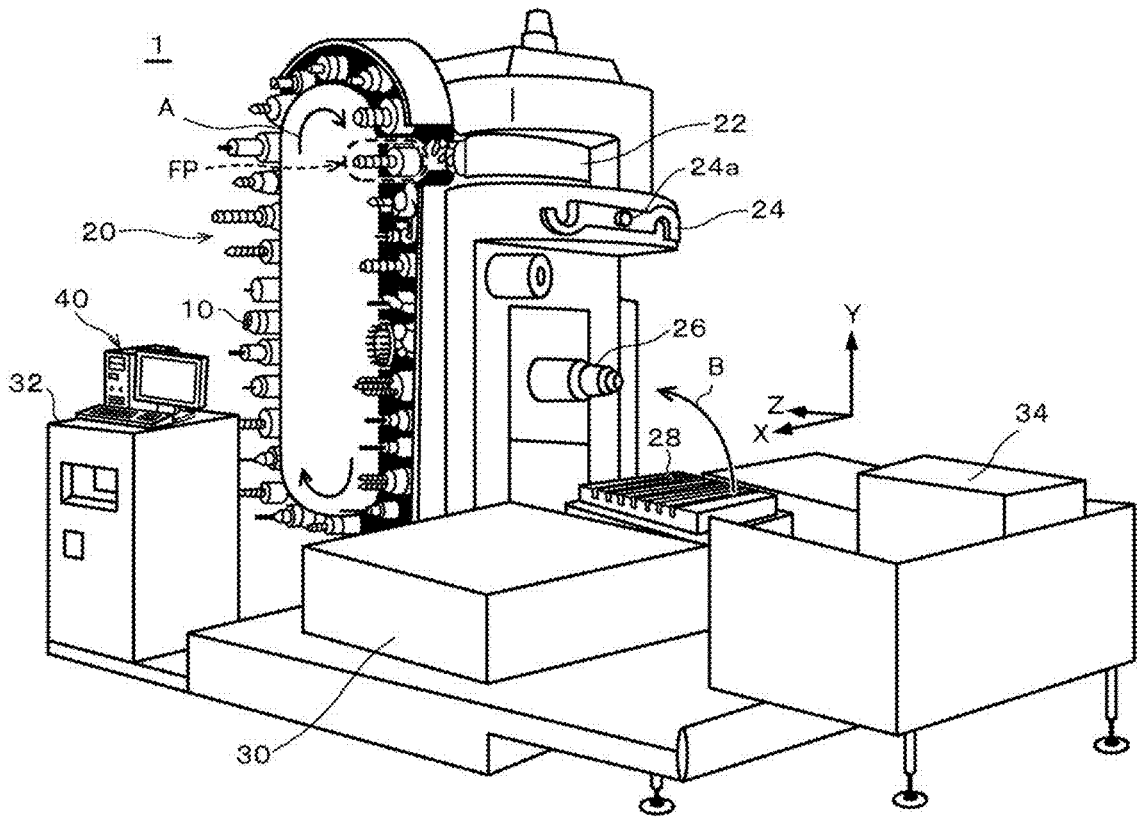
FIG. 1 is a perspective view illustrating the appearance of a CNC processing apparatus.

FIG. 1 is a perspective view illustrating the appearance of the CNC processing apparatus of the present embodiment. The CNC processing apparatus 1 includes a tool magazine 20, an intermediate arm 22, an ATC (auto tool changer) arm 24, a spindle 26, a pallet 28, a table 30, a CNC controller 32 and a cutting oil tank 34.

Multiple types of tools are stored on the tool magazine 20. The tool magazine 20 is capable of rotating these tools in the direction indicated by arrow A in the figure. The tool magazine 20 can move a tool for use in the processing to a fixed position FP.

The intermediate arm 22 picks up the tool that has been moved to the fixed position FP, from the tool magazine 20 and passes it to the ATC arm 24. The ATC arm 24 is rotated about a shaft 24*a* and mounts the tool received from the intermediate arm 22 onto the spindle 26. When a tool is already mounted on the spindle 26, the ATC arm 24 removes the tool from the spindle 26 and then mounts the tool received from the intermediate arm 22 onto the spindle 26. The tool that has been removed from the spindle 26 is returned to the fixed position FP on the tool magazine 20 by the intermediate arm 22.

An object to be processed (hereinafter, written as the "workpiece") is placed on the pallet 28 and fixed thereto. The pallet 28 is rotated in the direction indicated by arrow B in FIG. 1 and thereby rises up to bring the workpiece into opposed relation with the tool mounted on the spindle 26. The table 30 moves the pallet 28 in the X-axial, Y-axial and Z-axial directions shown in FIG. 1 in accordance with control signals output from the CNC controller 32. The CNC controller 32 further outputs control signals to the table 30 so as to tilt the spindle 26 with respect to the workpiece W (e.g., shown in FIGS. 4(*a*) and 4(*b*)). This configuration allows the CNC apparatus to perform, for example, 5-axis controlled machining by tilting the spindle 26 in two axial directions with respect to the workpiece W. That is, the CNC processing apparatus 1 can rotate the tool with the spindle 26 and can also control the position and orientation of the spindle 26 relative to the workpiece by means of the CNC controller 32. The CNC processing apparatus 1 can process the workpiece W in the manner described above.

After the workpiece has been processed, a sensor head 10 stored on the tool magazine 20 is moved to the fixed position FP. Next, by means of the intermediate arm 22 and the ATC arm 24, the sensor head 10 at the fixed position FP is replaced for the tool mounted on the spindle 26. Next, the CNC controller 32 changes the position and orientation of the spindle 26 relative to the workpiece in accordance with a preset pattern. Incidentally, the movement of the pallet 28 during measurement takes place only in the X-axial, Y-axial and Z-axial directions. During the movement, the sensor head 10 outputs measurement data including information regarding the distance to the workpiece at predetermined time intervals (for example, every 10 ms). A computer 40 generates three-dimensional profile data that shows the shape of the workpiece, based on the measurement data output from the sensor head 10 and the data indicating the position and orientation of the spindle 26 relative to the workpiece.

Figure 2:
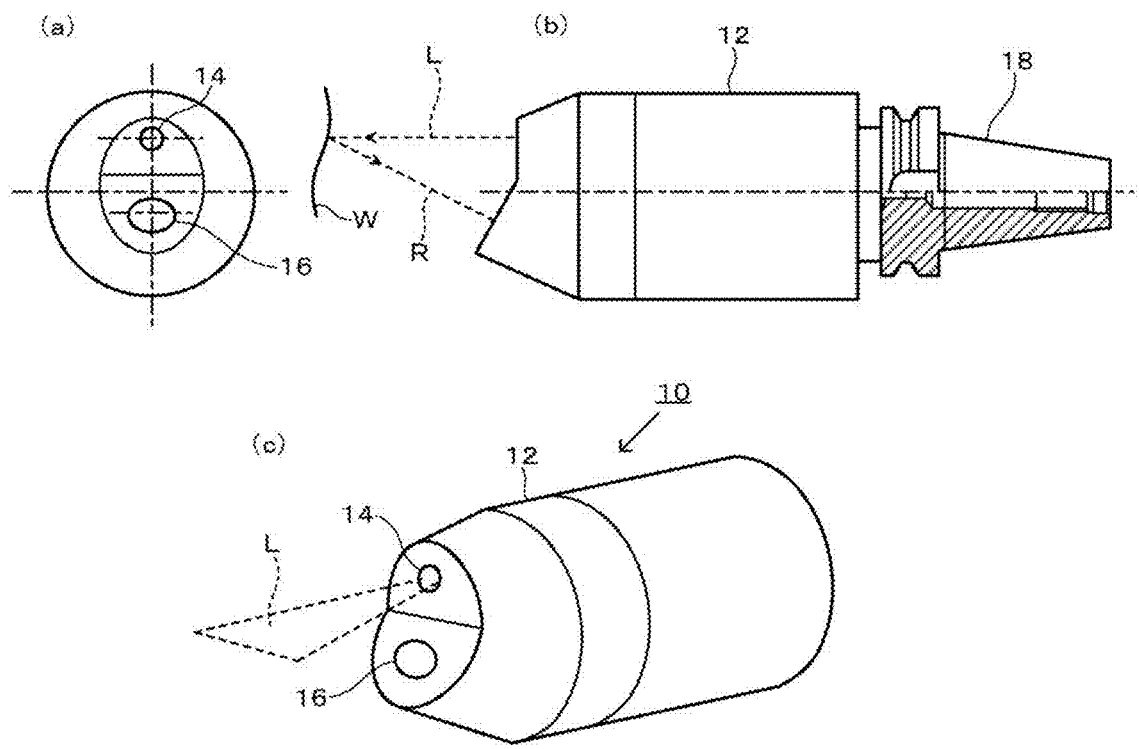
FIG. 2(a) is a front view of a sensor head.
FIG. 2(b) is a side view of the sensor head.
FIG. 2(c) is a perspective view illustrating the appearance of the sensor head.

The sensor head 10 will be described in greater detail with reference to FIG. 2. FIG. 2(*a*) is a front view of the sensor head 10. FIG. 2(*b*) is a side view of the sensor head 10. FIG. 2(*c*) is a perspective view illustrating the appearance of the sensor head 10. As illustrated in these drawings, the sensor head 10 includes a body 12 and a holder 18 for mounting the body 12 onto the spindle 26. The body 12 includes a non-contact sensor for measuring the distance to the workpiece. The holder 18 can be removably coupled to the spindle 26.

A light emitting window 14 and a light receiving window 16 are disposed at the front end (the left end in FIG. 2(*b*)) of the body 12. Laser light L that is emitted from the non-contact sensor built in the body 12 passes through the light emitting window 14 and reaches the workpiece W. Laser light R (reflected light) reflected from the surface of the workpiece W passes through the light receiving window 16.

The holder 18 is fitted on the rear end (the right end in FIG. 2(*b*)) of the body 12. The holder 18 has the same shape as the tools stored on the tool magazine 20. The holder 18 allows the sensor head 10 to be mounted on the spindle 26 similarly to other tools.

The oil resistance and waterproof performance of the sensor head 10 is desirably IP64 or above in the IP rating. Specifically, the protection on the human body and against the ingress of solid matters (the first digit) is desirably "6" or above (dustproof), and the protection against the ingress of water (the second digit) is desirably "4" or above (protection against splashing water).

Figure 3:
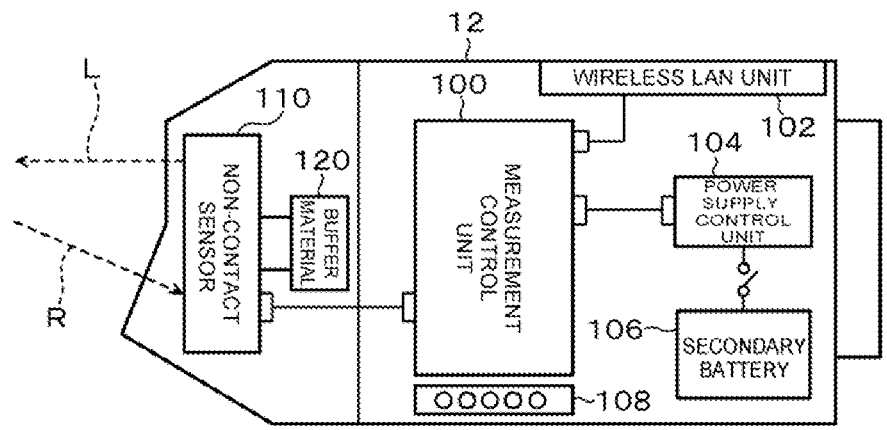
FIG. 3 is a block diagram illustrating the inside of a sensor head.
Figure 3:
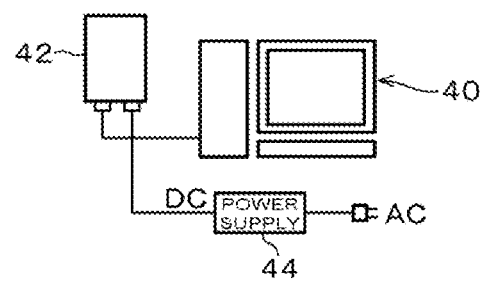

The configurations of the components disposed inside the body 12 of the sensor head 10 will be described with reference to FIG. 3. The inside of the body 12 includes a measurement control unit 100, a wireless LAN unit 102, a power supply control unit 104, a secondary battery 106, a monitor 108, a non-contact sensor 110 and a buffer material 120. The measurement control unit 100 receives data output from the non-contact sensor 110, for example, every 10 ms. Each time the measurement control unit 100 receives data output from the non-contact sensor 110, the measurement control unit 100 generates measurement data including information regarding the distance to the workpiece W. The measurement control unit 100 transmits the generated measurement data to the computer 40 via the wireless LAN unit 102.

The measurement data transmitted via the wireless LAN unit 102 is received by a wireless LAN unit 42 connected to the computer 40. The measurement data that has been received is accumulated in a medium such as a hard disk in the computer 40. A power supply 44 converts alternating current power to direct current power and supplies the electrical power to the computer 40 and the wireless LAN unit 42.

The non-contact sensor 110 is fixed to the body 12 through the buffer material 120. The sensor head 10 is sometimes caused to vibrate when the sensor head 10 is removed from the spindle 26. The sensor head 10 is sometimes caused to vibrate also when the sensor head 10 is moved between the spindle 26 and the tool magazine 20. The buffer material 120 can protect the non-contact sensor 110 from these vibrations of the sensor head 10.

The monitor 108 includes a plurality of LEDs. Each LED goes on and out corresponding to the on/off status of a signal within the measurement control unit 100. The status of operation of the measurement control unit 100 can be checked based on the illumination statuses of the LEDs. Further, the statuses of connection between the measurement control unit 100 and each of the wireless LAN unit 102, the power supply control unit 104 and the non-contact sensor 110 can be checked based on the illumination statuses of the LEDs.

Figure 4:
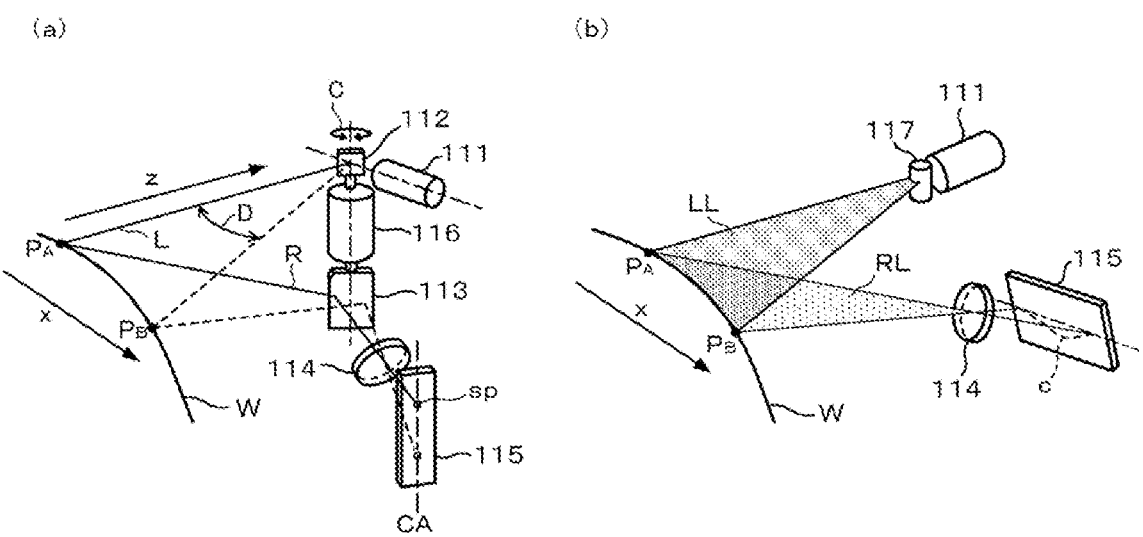
FIG. 4(a) illustrates an example of flying laser spot type non-contact sensors.
FIG. 4(b) illustrates an example of fixed-line laser type non-contact sensors.

Examples of the non-contact sensor 110 described above will be discussed with reference to FIG. 4. FIG. 4(a) illustrates an example of flying laser spot type non-contact sensors. FIG. 4(b) illustrates an example of fixed-line laser type non-contact sensors.

As illustrated in FIG. 4(a), a flying laser spot type non-contact sensor is composed of a laser diode 111, galvanometer mirrors 112, 113, a lens 114, a CCD 115, and a scanning motor 116. Laser light L emitted from the laser diode 111 is reflected by the galvanometer mirror 112 toward the workpiece W, passes through the light emitting window 14 (see FIG. 2), and is reflected at a measurement point P on the surface of the workpiece W. The reflected light R that has been reflected at the measurement point P passes through the light receiving window 16 illustrated in FIG. 2 and is reflected by the galvanometer mirror 113 toward the lens 114.

The reflected light R passes through the lens 114 and forms an image as a spotlight (a dot of light) sp on a predetermined axis CA of a light receiving section of the CCD 115 composed of a plurality of light receiving elements. The image data of the spotlight sp is output to the measurement control unit 100. The positions of the spotlights sp on the axis CA differ depending on the distance between the sensor head 10 and the measurement point P. The measurement control unit 100 (see FIG. 3) generates data including information of the distances between the sensor head 10 and the measurement point P based on the image data output from the CCD 115.

The galvanometer mirrors 112 and 113 described above are fixed to a drive shaft of the scanning motor 116. The drive shaft of the scanning motor 116 can rotate in the directions of arrow C in FIG. 4(a). As indicated by arrow D, the laser light L is periodically scanned so as to reciprocate within a predetermined range on the X-axis (for example, between the measurement points $P_A$ and $P_B$ on the surface of the workpiece W). The measurement control unit 100 transmits the measurement data to the computer 40. The measurement data includes information (Z) regarding the distances between the sensor head 10 and the measurement point P. The measurement data further includes information (X) regarding the positions of the laser light L on the X-axis. Thus, the measurement data wirelessly transmitted from the sensor head 10 to the computer 40 may be represented as (X, Z).

When the flying laser spot type non-contact sensor is used, the intensity of the laser light may be adjusted depending on the surface condition (such as, for example, the color or reflectance of the surface) of the workpiece W. Thus, the distance to the workpiece W may be measured with high accuracy by the use of the flying laser spot type non-contact sensor. On the other hand, the flying laser spot type non-contact sensor is expensive because of its complicated structure.

As illustrated in FIG. 4(b), a fixed-line laser type non-contact sensor is composed of a laser diode 111, a cylindrical lens (or a Powell lens) 117, a lens 114, and a CMOS image sensor (hereinafter, simply written as "CMOS") 115. Laser light emitted from the laser diode 111 is spread in the X-axial direction in FIG. 4(b) by the cylindrical lens (or the Powell lens) 117. Thus, the laser light emitted from the laser diode 111 forms line light (one line of light) LL. The line light LL passes through the light emitting window 14 (see FIG. 2) and illuminates a line extending from the measurement point $P_A$ to the measurement point $P_B$ on the surface of the workpiece W.

The reflected light RL of the line light LL passes through the light receiving window 16 (see FIG. 2) and is collected by the lens 114 to form an image on a light receiving section of the CMOS 115. The image is formed as line light and is captured by the CMOS 115. The image data is output to the measurement control unit 100. The line light captured by the CMOS 115 shows a curve c corresponding to the shape of the workpiece W from the measurement point $P_A$ to the measurement point $P_B$. Based on the curve c, the measurement control unit 100 calculates the distance between the sensor head 10 and an arbitrary position on the line extending from the measurement point $P_A$ to the measurement point $P_B$. The measurement control unit 100 then transmits the measurement data including information of the calculated distances, to the computer 40 through the wireless LAN unit 102.

In contrast to the flying laser spot type illustrated in FIG. 4(a), the fixed-line laser type non-contact sensor cannot apply laser light with minute control of intensity between the measurement points $P_A$ and $P_B$. However, the fixed-line type non-contact sensor is low in cost on account of its simple structure.

Although not illustrated in FIG. 1, the CNC processing apparatus 1 includes a contact sensor in addition to the non-contact sensor in the sensor head 10. For example, the contact sensor comprises a contact touch probe. For example, a touch signal acquired by the contact sensor is transmitted to the CNC controller 32 through wireless communication. The touch signal received by the CNC controller 32 may be accumulated as contact-type point data (x, y, z, xθ, yθ, zθ) at that point of time in, for example, a hard disk.

Figure 5:
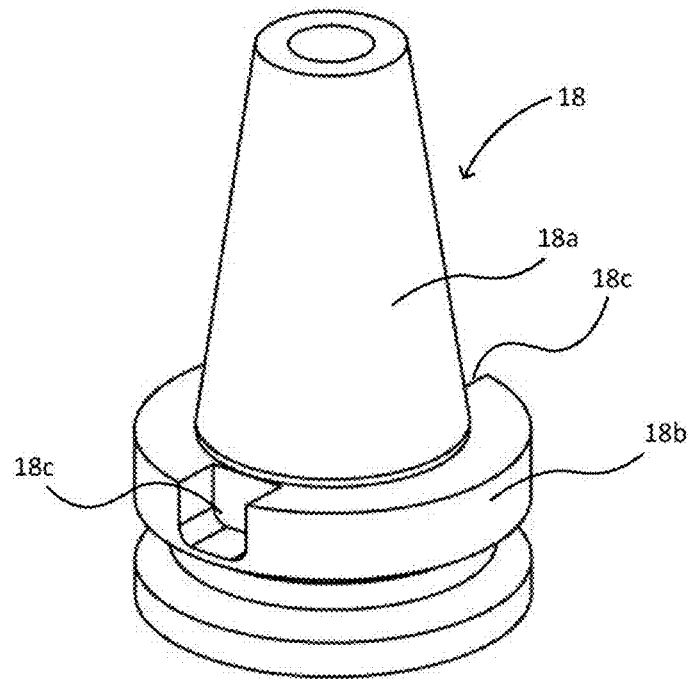
FIG. 5 is a more detailed perspective view of a holder.
Figure 6:
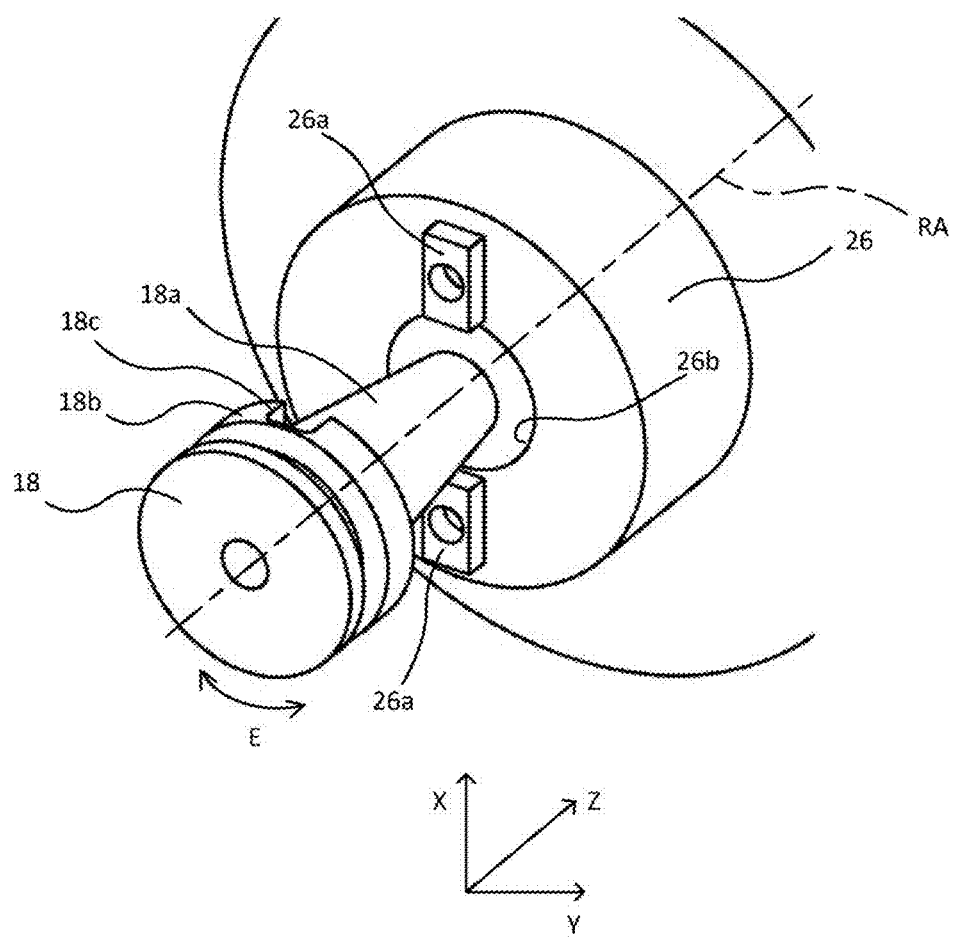
FIG. 6 is a perspective view of a holder being mounted onto a spindle.
Figure 7:
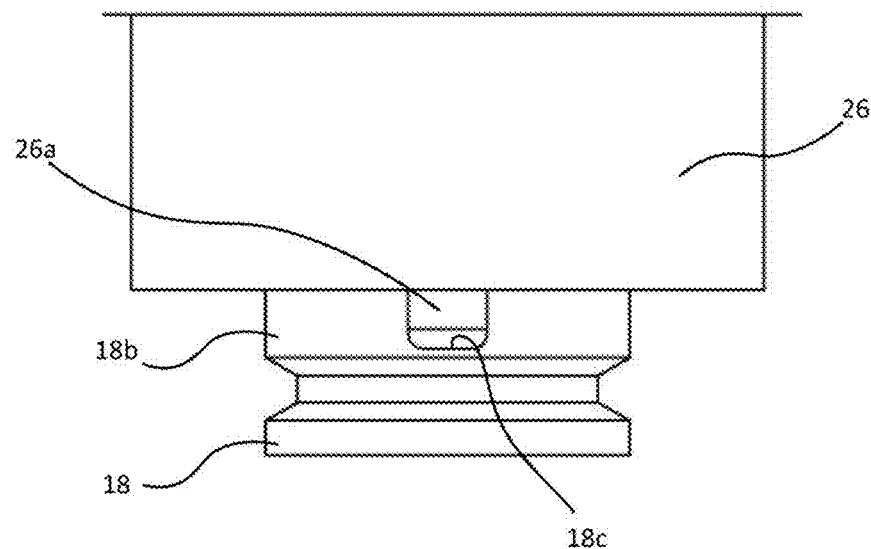
FIG. 7 is a front view of a holder mounted on a spindle.

FIG. 5 is a more detailed perspective view of the holder 18 described hereinabove. FIG. 6 is a perspective view of the holder 18 being mounted onto the spindle 26. FIG. 7 is a front view of the holder 18 mounted on the spindle 26. In FIGS. 5 to 7, the body 12 is omitted for simplicity.

As illustrated in FIG. 5, the holder 18 has a substantially conical trapezoidal tapered portion 18a and a substantially disk-shaped flange portion 18b. Two recesses 18c are formed in the flange portion 18b. The two recesses 18c are disposed at positions separated from each other by approximately 180 degrees in the circumferential direction.

On the other hand, as illustrated in FIG. 6, the spindle 26 on which the holder 18 will be mounted has two protrusions 26a at positions corresponding to the two recesses 18c. The holder 18 may be mounted onto the spindle 26 by inserting the tapered portion 18a of the holder 18 into a mounting hole 26b of the spindle 26. As illustrated in FIG. 7, the holder 18 is mounted on the spindle 26 with the two protrusions 26a being fitted into the two recesses 18c.

At least a certain amount of clearance (circumferential clearance) is provided between the protrusion 26a and the recess 18c to ensure that the holder 18 will be smoothly attached to and detached from the spindle 26. Thus, the holder 18 that has been mounted on the spindle 26 can rotate slightly (by the amount of clearance) about the Z-axis. That is, the holder 18 is slightly rotatable in the directions of arrow E in FIG. 6.

On the other hand, the holder 18 that has been mounted on the spindle 26 cannot move in the X-axial, Y-axial and Z-axal directions. Here, the Z axis is an axis parallel to the rotational axis RA of the spindle 26. The X-axis and the Y-axis are axes in two directions perpendicular to the Z-axis (see FIG. 6).

The sensor head 10 is integral with the holder 18 and therefore, when the holder 18 rotates about the Z-axis, the sensor head 10 also rotates about the Z-axis. The rotation of the sensor head 10 about the Z-axis changes the position of the non-contact sensor built in the sensor head 10, and consequently the value measured by the non-contact sensor becomes incorrect. To ensure that the non-contact sensor will accurately measure the surface shape of the workpiece, it is necessary to recalibrate the non-contact sensor after the holder 18 (the sensor head 10) is mounted onto the spindle 26.

The present inventors completed the present invention focusing on the fact that in general CNC processing apparatuses, the holder is slightly rotatable about the Z-axis but cannot move in the X-axial, Y-axial and Z-axial directions and cannot rotate about the X-axis and the Y-axis.

The following describes a method for the calibration of the non-contact sensor in the CNC processing apparatus according to the present embodiment. Here, the term calibration means that the displacement of the center coordinates measured with the non-contact sensor is adjusted based on the center coordinates obtained by measuring a reference instrument (for example, a reference sphere) with a contact probe. The term also includes the calculation of the angles (X$\theta$0, Y$\theta$0, Z$\theta$0) and offsets (X0, Y0, Z0) that are necessary for the adjustment. Calibration is sometimes called qualification.

Figure 8:
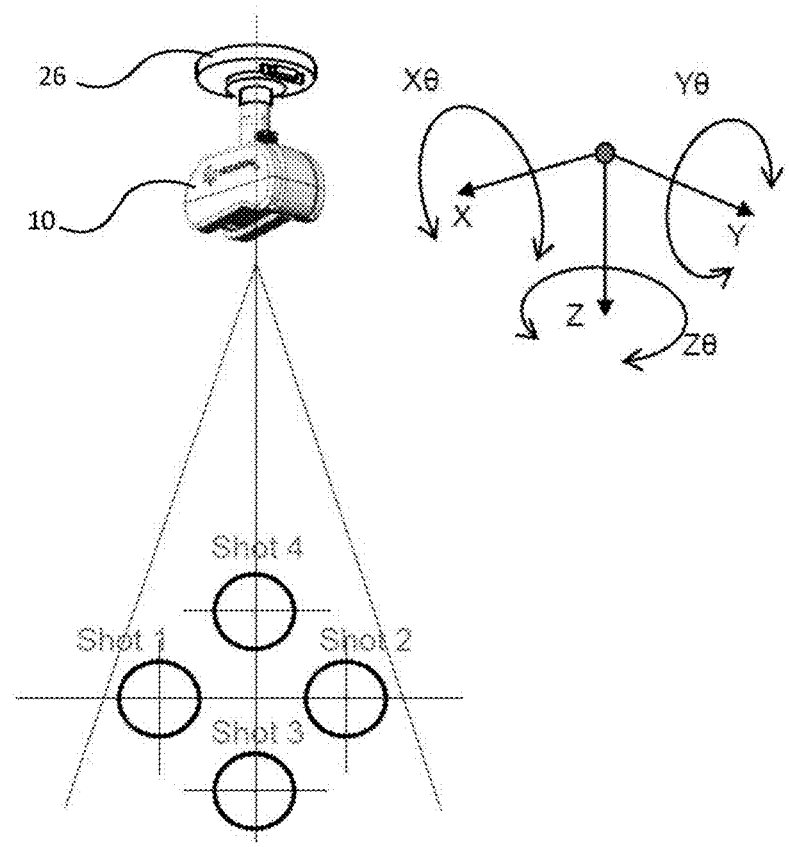
FIG. 8 is a schematic view illustrating the first calibration performed before measuring the shape of a workpiece.

FIG. 8 is a schematic view illustrating the first calibration performed before measuring the shape of a workpiece W with the CNC processing apparatus 1.

The first calibration starts with measuring the center coordinates (TX, TY, TZ) of a reference sphere in a machine coordinate system using the contact sensor (the contact probe) mounted on the spindle 26.

Next, the center coordinates (SX1, SY1, SZ1) of the reference sphere in a non-contact sensor coordinate system are measured using the sensor head 10 (the non-contact sensor 110) mounted on the spindle 26. The measurement is repeated three or more times while changing the position of the non-contact sensor after each measurement. Incidentally, FIG. 8 illustrates an example in which such measurement is performed four times. The center coordinates (SX2, SY2, SZ2) are obtained in the second measurement. The center coordinates (SX3, SY3, SZ3) are obtained in the third measurement. The center coordinates (SX4, SY4, SZ4) are obtained in the fourth measurement. These are organized in Table 1 below.

TABLE 1

|  |  | Center coordinates of reference sphere | | |
|---|---|---|---|---|
|  |  | X | Y | Z |
| Contact probe machine coordinate system | | TX | TY | TZ |
| Non-contact sensor coordinate system | Measurement 1 | SX1 | SY1 | SZ1 |
| | Measurement 2 | SX2 | SY2 | SZ2 |
| | Measurement 3 | SX3 | SY3 | SZ3 |
| | Measurement 4 | SX4 | SY4 | SZ4 |

Next, calculations are made to determine the angles (X$\theta$0, Y$\theta$0, Z$\theta$0) and offsets (X0, Y0, Z0) required to bring the center coordinates in the non-contact sensor coordinate system into agreement with the center coordinates in the machine coordinate system measured with the contact probe.

For example, X$\theta$0 may be calculated as the amount of rotation of the sensor head 10 in the X$\theta$ direction required to bring SY3 and SY4 into agreement with TY. Y$\theta$0 may be calculated as the amount of rotation of the sensor head 10 in the Y$\theta$ direction required to bring SZ1 and SZ2 into agreement with TZ. Z$\theta$0 may be calculated as the amount of rotation of the sensor head 10 in the Z$\theta$ direction required to bring SY1 and SY2 into agreement with TY. X0 may be calculated as the amount of displacement in the X-axial direction required to bring the average value of SX1 to SX4 into agreement with TX. Y0 may be calculated as the amount of displacement in the Y-axial direction required to bring the average value of SY1 to SY4 into agreement with TY. Z0 may be calculated as the amount of displacement in the Z-axial direction required to bring the average value of SZ1 to SZ4 into agreement with TZ. Here, X$\theta$ means the direction of rotation about the X-axis. Y$\theta$ means the direction of rotation about the Y-axis. Z$\theta$ means the direction of rotation about the Z-axis.

After the first calibration is performed as described above, the surface shape of the workpiece W is measured with the CNC processing apparatus 1. Using the angles (X$\theta$0, Y$\theta$0, Z$\theta$0) and offsets (X0, Y0, Z0) calculated above, the coordinates in the non-contact sensor coordinate system that are measured with the non-contact sensor 110 built in the sensor head 10 may be converted into coordinates in the contact probe machine coordinate system.

Next, the workpiece W may be machined by replacing the sensor head 10 mounted on the spindle 26 with a tool. After the workpiece W has been processed, the surface shape of the workpiece W may be measured by replacing the tool mounted on the spindle 26 with the sensor head 10. As already mentioned, when the sensor head 10 that has been replaced is re-mounted onto the spindle 26, it is necessary to calibrate again the non-contact sensor 110 built in the sensor head 10.

Figure 9:
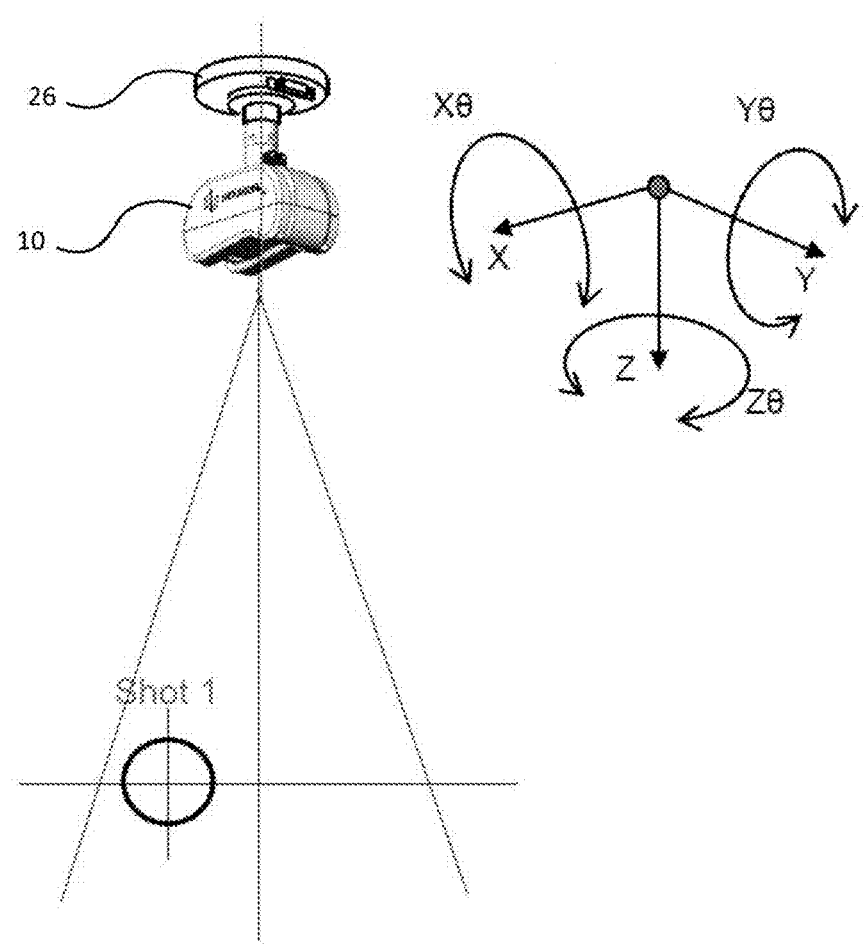
FIG. 9 is a schematic view illustrating the second and subsequent calibrations.

FIG. 9 is a schematic view illustrating the second and subsequent calibrations.

The holder 18 for mounting the sensor head 10 on the spindle 26 is slightly rotatable about the Z-axis, but cannot move in the X-axial, Y-axial and Z-axial directions and cannot rotate about the X-axis and the Y-axis. Therefore, in the second and subsequent calibrations, only the rotation of the sensor head 10 about the Z-axis should be considered, and it is not necessary to consider the movements in the X-axial, Y-axial and Z-axial directions or the rotations about the X-axis and the Y-axis. That is, in the second and subsequent calibrations, the center coordinates of the reference sphere needs to be measured only one time with the non-contact sensor, and it is not necessary to measure the center coordinates three or more times.

In the second and subsequent calibrations, first, the center coordinates (TX2, TY2, TZ2) of the reference sphere in the contact probe machine coordinate system are measured with the contact sensor (the contact probe) mounted on the spindle 26 (first step).

Next, after mounting the sensor head 10 onto the spindle 26, the center coordinates (SX2, SY2, SZ2) of the reference sphere in the non-contact sensor coordinate system are measured only one time using the sensor head 10 (the non-contact sensor 110) (second step). These are organized in Table 2 below. When the position of the reference sphere is not changed from the position in the first step, the center coordinates measured in the previous time are used in place of (SX2, SY2, SZ2).

TABLE 2

|  | Center coordinates of reference sphere | | |
| --- | --- | --- | --- |
|  | X | Y | Z |
| Contact probe machine coordinate system | TX2 | TY2 | TZ2 |
| Non-contact sensor coordinate system | SX2 | SY2 | SZ2 |

Next, calculations are made to determine the angle ($Z\theta 1$) and offsets (X1, Y1, Z1) required to bring the coordinates in the non-contact sensor coordinate system into agreement with the coordinates in the contact probe machine coordinate system (third step).

In the second and subsequent calibrations, only the rotation of the sensor head 10 about the Z-axis should be considered, and it is not necessary to calculate $X\theta 1$ and $Y\theta 1$.

For example, $Z\theta 1$ may be calculated as the amount of rotation of the sensor head 10 in the $Z\theta$ direction required to bring SY2 into agreement with TY2. X1 may be calculated as the amount of displacement in the X-axial direction required to bring SX2 into agreement with TX2. Y1 may be calculated as the amount of displacement in the Y-axial direction required to bring SY2 into agreement with TY2. Z1 may be calculated as the amount of displacement in the Z-axial direction required to bring SZ2 into agreement with TZ2.

By adding the angle ($Z\theta 1$) and offsets (X1, Y1, Z1) calculated above to the angles ($X\theta 0$, $Y\theta 0$, $Z\theta 0$) and offsets (X0, Y0, Z0) calculated in the first calibration, the next angles ($X\theta 0$, $Y\theta 0$, $Z\theta 0+Z\theta 1$) and offsets (X0+X1, Y0+Y1, Z0+Z1) are obtained. The coordinates measured with the non-contact sensor 110 built in the sensor head 10 may be converted using the next angles ($X\theta 0$, $Y\theta 0$, $Z\theta 0+Z\theta 1$) and offsets (X0+X1, Y0+Y1, Z0+Z1). The measures thus obtained may be handled as highly accurate measurement data.

According to the method for the calibration of the CNC processing apparatus 1 of the present embodiment, the center coordinates of the reference sphere are measured only one time with the non-contact sensor. Thus, the amount of time required for each calibration can be significantly reduced.

While the above embodiment has illustrated the reference instrument as being a sphere, the reference instrument may have another shape. For example, a cubic reference instrument may be used, or a regular triangular pyramid reference instrument may be used.

BRIEF DESCRIPTION OF THE REFERENCE SIGNS

1 CNC PROCESSING APPARATUS
10 SENSOR HEAD
12 BODY
18 HOLDER
20 TOOL MAGAZINE
26 SPINDLE
110 NON-CONTACT SENSOR

The invention claimed is:

1. A method for recalibrating a non-contact sensor in a CNC processing apparatus, wherein the CNC processing apparatus is configured to process an object with a tool, replace the tool mounted on a spindle with the non-contact sensor, and measure a surface shape of the object with the non-contact sensor, comprising:
   a first step of measuring center coordinates of a reference instrument with a contact probe and thereby determining machine coordinates of a center of the reference instrument,
   a second step of, after mounting of the non-contact sensor onto the spindle, measuring the center coordinates of the reference instrument only one time with the non-contact sensor, and thereby determining the non-contact sensor coordinates of the center of the reference instrument,
   a third step of calculating an amount of displacement required to bring the non-contact sensor coordinates obtained in the second step into agreement with the machine coordinates obtained with the contact probe in the first step,
and adding the amount of displacement calculated above to an amount of displacement calculated in a first calibration of the non-contact sensor performed before an object processing.

2. The method according to claim 1, wherein the reference instrument is spherical.

* * * * *